2 Sheets—Sheet 1.
P. K. DEDERICK.
Baling Press.
No. 231,215. Patented Aug. 17, 1880.
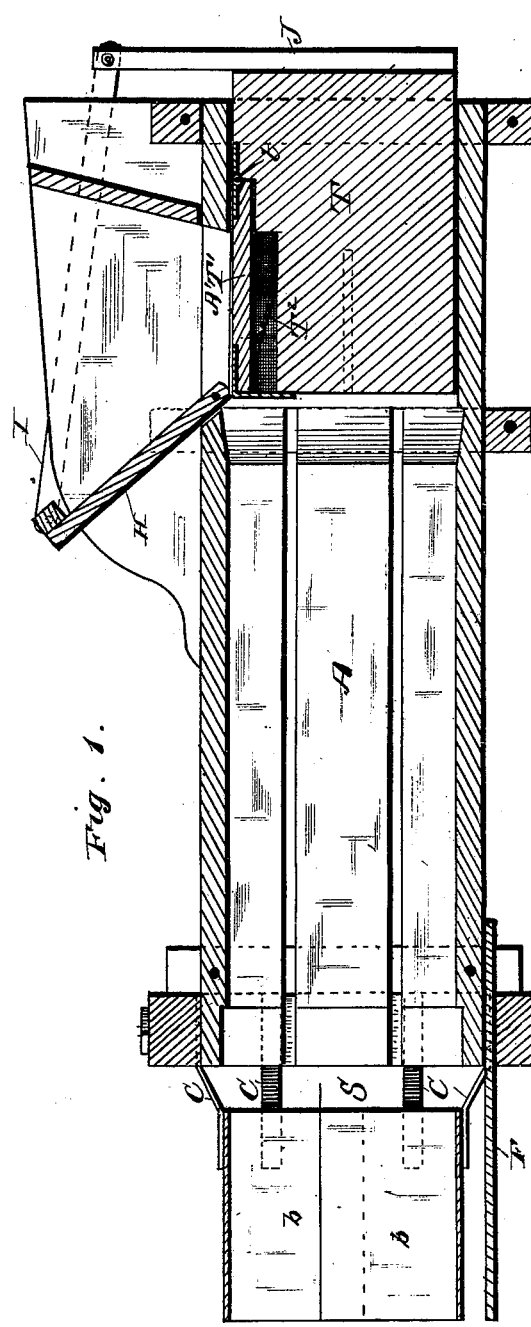
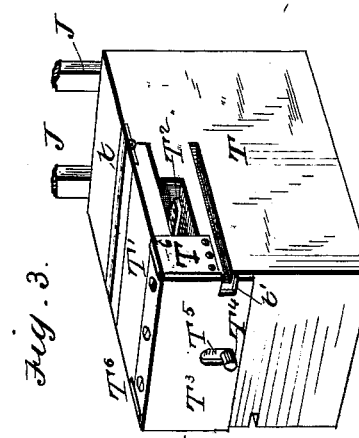
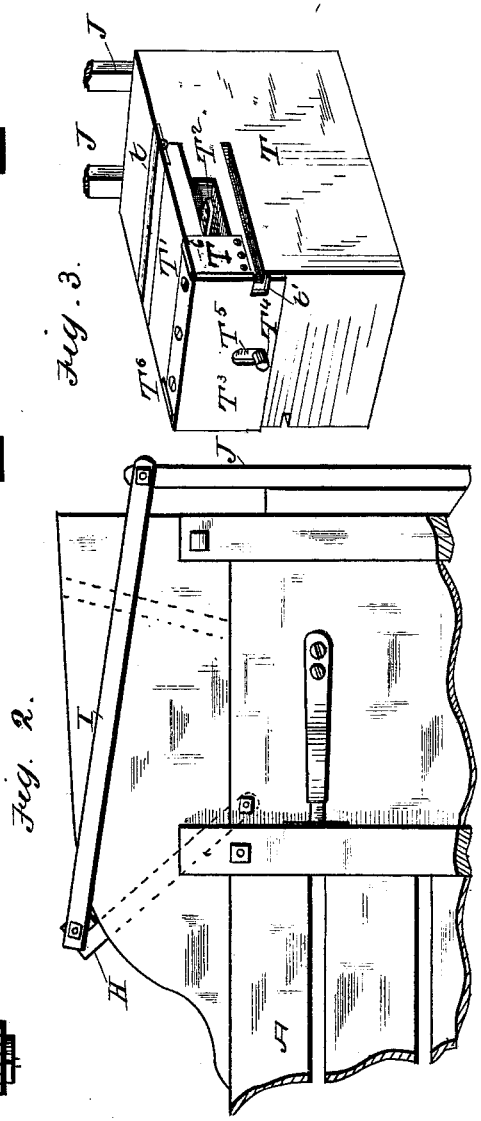
Attest:
W. H. H. Knight
W. Blackstock
Inventor.
P. K. Dederick
By L. Hill
His Atty P. K. DEDERICK.
Baling Press.

No. 231,215. Patented Aug. 17, 1880.

Attest,
W. H. N. Knight
W. Blackstock

Inventor,
P. K. Dederick
By L. Hill,
His Atty.

UNITED STATES PATENT OFFICE.

PETER K. DEDERICK, OF ALBANY, NEW YORK.

BALING-PRESS.

SPECIFICATION forming part of Letters Patent No. 231,215, dated August 17, 1880.

Application filed November 25, 1879.

*To all whom it may concern:*

Be it known that I, PETER K. DEDERICK, of Albany, Albany county, New York, have invented certain new and useful Improvements in Baling-Presses; and I do hereby declare the following to be a full, clear, and exact description of the same, reference being had to the accompanying drawings, forming part of this specification, in which—

Figure 4:
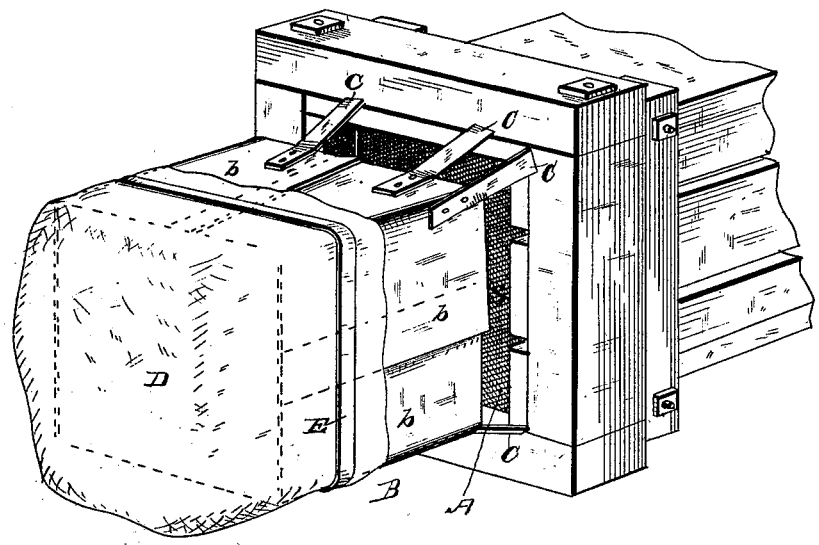
Figure 5:
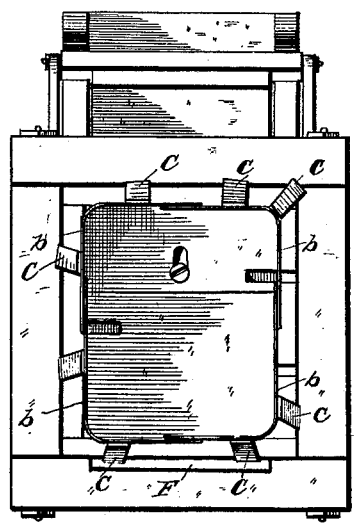

Figure 1 is a longitudinal sectional view of a press provided with my improvements; Fig. 2, a detail view, showing particularly the manner of connecting the movable side of the hopper to the traverser, and also showing one of the retainers; Fig. 3, a perspective view of the traverser; Fig. 4, a perspective view of the sacking devices, and Fig. 5 an end view looking into the sacking-funnel.

Similar letters of reference in the several figures denote the same parts.

This invention relates to improvements in that class of baling-presses for which Letters Patent were granted me October 29, 1872, Nos. 132,566 and 132,639, also' No. 134,592, dated June 7, 1873, and No. 214,282, dated April 15, 1879, and others.

The invention consists, first, in novel means for sacking the bales; secondly, in an improved condensing feed-hopper; and, thirdly, in an improved construction of the traverser, all which I will now proceed to describe and embrace in the claims.

In the drawings, A represents the bale-chamber, A' the press-box, and T the reciprocating traverser. Located at the discharge end of the press is a funnel, B, on which the sacks or bags are slipped, and through which hte bales are forced into the sacks. The said funnel is preferably made of sheet metal, and is formed in four (more or less) sections, *b b b b*, connected to the press by flexible metal straps C. These straps may be applied at the corners of the funnel, or both at the corners and at all but one of the sides, as shown.

The inner end of the funnel is held by the straps at some distance from the discharge end of the press, so as to leave an open space, S, sufficient to enable the followers to be removed from in front of the bales at the side where there are no straps C, so that the bales only will pass into the funnel. As each bale emerges from the bale-chamber it begins to expand, and continues to do so after it enters the funnel. The funnel, being itself adjustable, is of course enlarged by such expansion of the bale, causing the sack that is on it to be held tighter, so that when the sack is pulled off by the bale it will be smoothly and tightly stretched. The mouth of the funnel toward the press is slightly flared, so as to facilitate the entrance of the bales into it.

When the press is in operation a single operator is enabled to remove one bale from the funnel, take out the follower in front of the next succeeding bale, and slip a new sack over the funnel before the said next bale enters the mouth of the funnel. The expansion of the funnel is ordinarily sufficient to prevent the sack from being pulled off too fast; but, as means for further detention, an elastic band, E, of rubber or other material, may be applied over the sack, which band will stretch, so as to permit the funnel to expand, and will be drawn off with the sack.

Inasmuch as the connecting-straps are hardly strong enough to support the weight of a bale, I employ a supporting-plate, F, projecting from the end of the press, as shown, to assist them. A narrow space may be left between the funnel and this plate, to permit the sack to be drawn over the funnel, or the funnel may rest directly on the plate and the sack be slipped over both funnel and plate, as preferred.

As a modification of the construction above described, the funnel might be brought up close to the end of the bale-chamber, and an opening cut in the side wall of the bale-chamber near the end, through which to remove the followers. In order, however, to enable the operator to time his movements with such an arrangement so as to take out a bale from the funnel, remove a follower, and apply a new sack to the funnel before the next bale enters the funnel, the walls of the bale-chamber, near the discharge end thereof, would have to be cut away or enlarged, so that the bale could be loosened and pulled out by the operator sooner than it otherwise could be.

The feed-hopper is constructed with a movable side, H, hinged at its lower edge, and having connected at its upper edge rods I, jointed to arms J, secured to the rear end of the traverser. When the traverser is at the forward limit of its stroke the loose material is pitched onto the hopper, and as the traverser retreats the hinged side H compresses the material into a compact charge, which is then forced down into the press-box in front of the traverser. This arrangement greatly facilitates the feeding of the press.

The top T' of the traverser is hinged at $t$, and is pressed outward by a spring, $T^2$, arranged beneath it. A plate, $T^3$, attached to the top T', extends down the front face of the traverser and covers the chamber or space in which the spring is located, so as to prevent the entrance of the hay into such space. Driven into the face of the traverser is a stud or screw, $T^4$, which enters a slot, $T^5$, in the plate $T^3$, and limits the movement of the top. The plate $T^3$ is notched or cut away at $t'$ in line with the slots in the sides of the traverser, to permit the passage of the retainers. As the traverser moves forward to force a charge of material into the bale-chamber its hinged and spring-seated top T' yields, to prevent any locks of hay which may overlap said top from causing the traverser to bind. In ordinary presses said overlapped locks sometimes fall down over the lateral sides of the traverser and are forced into the slots in the sides by the retainers, and interfere with the proper operation of the latter. To provide against the happening of this I fasten plates $T^6$ $T^6$ to the sides of the traverser near its upper forward corners, as shown in Fig. 3. These plates extend to the top of the traverser-top when the latter is in its normal position; but when it is depressed by overlapped locks they project above said top and completely bar the locks from falling off laterally, as will be apparent.

I claim as my invention—

1. The combination of a baling-press and a sacking-funnel, arranged at the discharge end thereof, with an opening between the press and sacking device for the removal of the followers laterally before they reach the sacking-funnel, substantially as described.

2. The combination, with a baling-press, of a sacking-funnel supported a short distance from the discharge end of the press by means of straps connected to the press, so as to leave a space between the funnel and the end of the press, through which to remove the followers laterally before they reach the funnel, substantially as described.

3. The combination, with a baling-press, of a sectional sacking-funnel arranged at a short distance from the discharge end of the press, so as to leave a space between it and the press for the removal laterally of the followers before they reach the funnel, and supported by flexible connections applied to each of its sections, substantially as described.

4. The sectional sacking-funnel B, composed of the angular sections $b$, and held at a short distance from the end of the press by means of flexible straps C, applied to each of its sections, substantially as described.

5. The combination, with the sacking-funnel connected to the press by the flexible straps, as described, of the plate F, for assisting in supporting the funnel, substantially as described.

6. The combination, with an expansible sacking-funnel, of an elastic band for assisting in holding the sack, substantially as described.

7. The combination of the hopper, having the hinged sides H, with the reciprocating traverser and the rods I and arms J, substantially as described.

8. The traverser, having its top T hinged to it at $t$, and having a spring, $T^2$, for pressing the hinged top outward, and a plate, $T^3$, for limiting the movement of the top and preventing the entrance of material into the space occupied by the spring, substantially as described 9. The side plates, $T^6$ $T^6$, for preventing the overlapped hay from falling over the sides of the traverser and down onto the retainers, substantially as described.

P. K. DEDERICK.

Witnesses:
R. J. VAN SCHOONHOVEN,
E. S. DEDERICK.